3,300,458
CONTINUOUS PROCESSES FOR THE PRODUCTION OF ETHYLENE POLYMERS AND CATALYSTS SUITABLE THEREFOR
Robert M. Manyik, St. Albans, and Wellington E. Walker and Thomas P. Wilson, Charleston, W. Va., assignors to Union Carbide Corporation, a corporation of New York
Filed Aug. 19, 1963, Ser. No. 302,951
34 Claims. (Cl. 260—88.2)

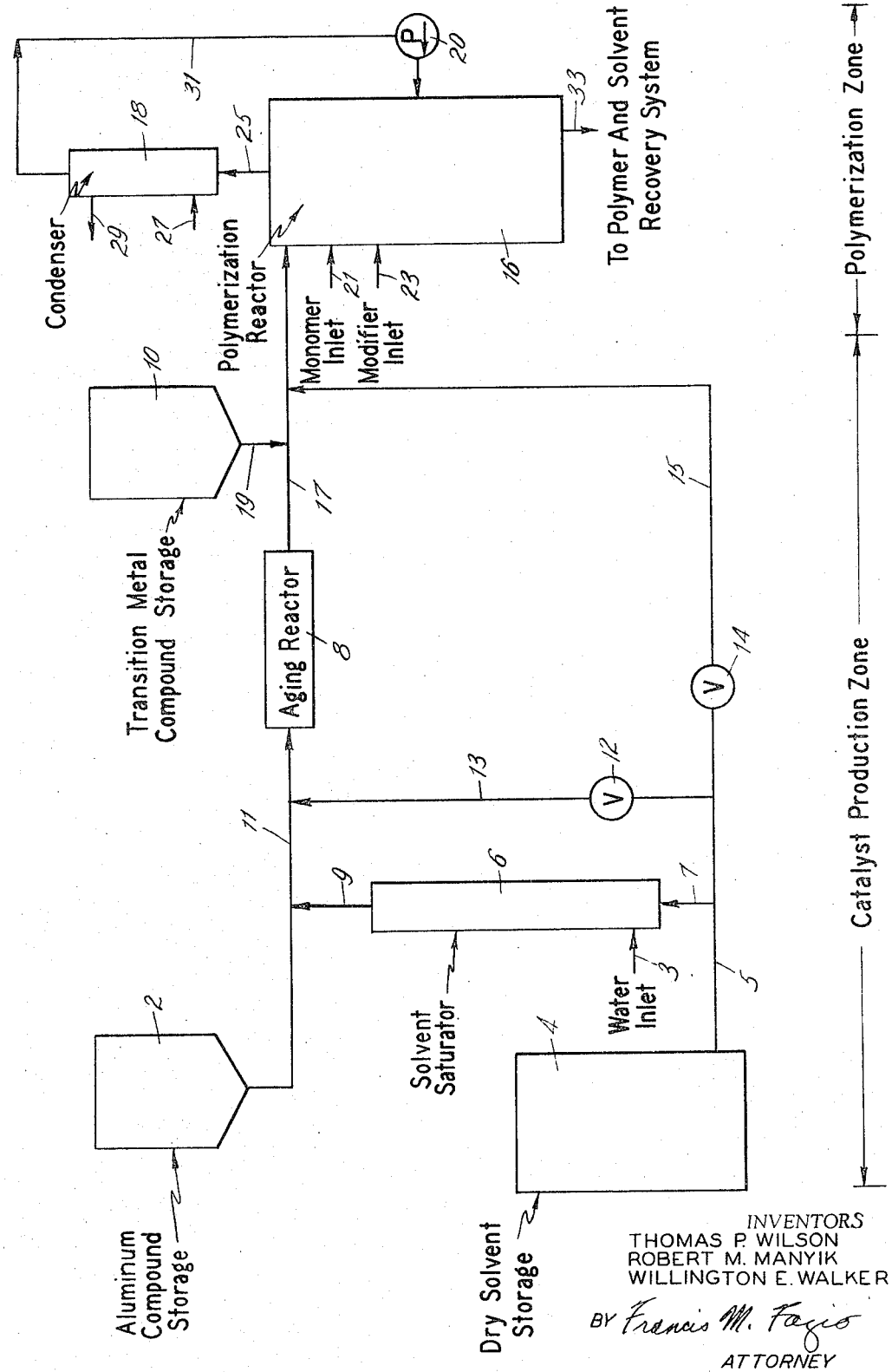

This invention relates to a continuous process for the production of ethylene polymers, and to a continuous and improved process for producing the catalysts suitable therefor. In one aspect it relates to the process for producing a component of the catalyst complex in a highly active form in a continuous and efficient manner; and in another aspect it relates to the production of solid ethylene polymers containing polymerized dimeric or trimeric units in the polymer molecule.

It had previously been discovered that mono-unsaturated alpha-olefins can be polymerized to solid high molecular weight polymers by contacting the alpha-olefins with a catalyst complex of a poly(hydrocarbylaluminum oxide) and a transition metal compound of the metals of Groups IV-A, V-A and VI-A of the Periodic Chart of the Atoms. It was also found that this catalyst complex can, if desired, contain a compound of the metals of Groups I-A, II-A and III-B as a third component; however, this third component was found not to be essential to the operability of the process and its main purpose appears to be as a scavenger for trace impurities present in the reaction mixture. The Periodic Chart referred to is the 1956 Edition published by W. M. Welch Manufacturing Company, Chicago, Illinois. The poly(hydrocarbylaluminum oxide) component used in the above-described catalyst complex was produced by the addition of water to an anhydrous solution of a hydrocarbylaluminum compound in a dry, inert, organic solvent. While this method produced an active poly(hydrocarbylaluminum oxide), the addition of water in incremental amounts necessarily resulted in momentary high concentration in those areas in which the water initially contacted the solution. This resulted in overreaction of some of the hydrocarbylaluminum compound with the water and its conversion to inactive aluminum oxide rather than to the desired active poly(hydrocarbylaluminum oxide); as a result there was also the possibility of unreacted hydrocarbylaluminum compound remaining in the solution. It was also found that the use of catalyst complexes containing poly(hydrocarbylaluminum oxides) produced in this manner in the polymerization process resulted in polymer reaction slurries which were quite thick at 5 to 10 percent solids contents. This was a distinct disadvantage in that it made stirring difficult and necessitated increasing the sizes of the reactors, stills, etc., as well as the amounts of solvents that would have to be recycled.

It has now been found that highly active poly(hydrocarbylaluminum oxides) can be produced continuously and efficiently by reacting a solution of the hydrocarbylaluminum compound in an organic solvent with a water-wetted solvent, as will be fully described below; and that catalyst complexes containing the poly(hydrocarbylaluminum oxides) so produced overcome the deficiencies previously observed. The use of the catalyst complexes produced as herein described results in the production of highly fluid polymer slurries at high conversion rates having solids contents up to about 35 percent by weight. The fact that polymer slurries having such high solids contents could be produced that were still fluid and capable of being pumped and stirred without any undue difficulties was an unexpected and unobvious result which is of great economical importance in commercial operation. It was also observed that the polymers produced by the herein defined processes are exceptionally pure and as a result it is not necessary to further treat the polymer to remove the minute traces of catalyst residues present therein. This is also an unexpected economic advantage not attainable with other known processes in which catalysts containing metal atoms are used.

In the catalytic polymerization of ethylene with the catalyst complexes herein described some of the ethylene monomer generally trimerizes and produces hexene-1. This then copolymerizes with the ethylene in the form of monomer units of the formula

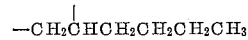

and as a result the polymer contains butyl side chains, it being a copolymer of ethylene and hexene-1. In some instances, dimerization to butene-1 takes place and the resulting polymer is then a copolymer of ethylene and butene-1 having ethyl side chains.

The accompanying drawing, not drawn to scale, is a diagrammatic illustration of a reaction unit suitable for carrying out this invention. Referring to the drawing, dry hydrocarbon solvent from storage vessel 4 is conveyed via conduits 5 and 7 into solvent saturator 6; the solvent saturator can be a packed column or other known piece of apparatus into which water can be introduced via an inlet 3 located at any suitable point on saturator 6 and in which the solvent becomes wetted with water. The water-wetted solvent is conveyed via conduit 9 to conduit 11 where it comes into contact with a calculated amount of an anhydrous solution of a hydrocarbylaluminum compound drawn from storage vessel 2 and the reaction to produce the poly(hydrocarbylaluminum oxide) commences. The admixture is conveyed into aging reactor 8 in which the reaction is completed. Aging reactor 8 can be a tubular reactor or other suitable apparatus and the retention time of the mixture therein is controlled and adjusted to ensure complete conversion of hydrocarbylaluminum compound to poly(hydrocarbylaluminum oxide). After the solution of poly(hydrocarbylaluminum oxide) leaves aging reactor 8 via conduit 17, the calculated amount of the second component of the catalyst complex, the transition metal compound, is added from storage vessel 10. In the drawing this addition is shown via conduit 19 into conduit 17; nevertheless, the addition can be made directly into polymerization reactor 16 but this is not preferred. Additional dry solvent can be added from storage vessel 4 either before the mixture enters the aging reactor 8 or after it has exited from the aging reactor 8 or at both locations; this is carried out via conduits 13 and 15 and is controlled by proper manipulation of valves 12 and 14. The catalyst complex stream enters the polymerization reactor 16 and is contacted with monomer introduced via inlet 21 and desired modifiers introduced via inlet 23. The temperature in the polymerization reactor 16 is mainly controlled by recycling vapors of the solvent and monomers; the hot vapors enter condenser 18 via conduit 25, where a small amount condenses and the condensate flows back into the polymerization reactor 16 while the major amount of the vapors are cooled and recycled as such via conduit 31 and pump 20; cooling water enters and exits condenser 18 via conduits 27 and 29 respectively. A slurry of polymer in solvent is removed from polymerization reactor 16 via conduit 33 and conveyed to a polymer and solvent recovery system, not shown but well known to one skilled in the art. Also not shown on polymerization reactor 16 are stirring means and additional cooling means which may be added if desired.

The poly(hydrocarbylaluminum oxide) produced by the process of this invention and used as a component of the catalyst complex suitable for the production of ethylene polymers consists of units of the formula:

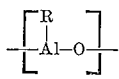

wherein R represents a hydrocarbyl radical containing from 1 to about 12 carbon atoms. Illustrative thereof are the alkyl radicals such as methyl, ethyl, propyl, isopropyl, butyl, isobutyl, t-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, benzl, phenethyl, and the like; and the aryl radicals such as phenyl, tolyl, xylyl, butylphenyl, naphthyl, methylnaphthyl, and the like.

Illustrative of the suitable poly(hydrocarbylaluminum oxides) are poly(methylaluminum oxide), poly(ethylaluminum oxide), poly(isopropylaluminum oxide), poly(n-butylaluminum oxide), poly(isobutylaluminum oxide), poly(decylaluminum oxide), poly(dodecylaluminum oxide), poly(benzylaluminum oxide), poly(phenylaluminum oxide), poly(tolylaluminum oxide), poly(napthylaluminum oxide), poly(ethylnaphthylaluminum oxide), and the like.

In producing the poly(hydrocarbylaluminum oxides) a solution of a hydrocarbylaluminum compound in an anhydrous, inert, hydrocarbon solvent is contacted with a water-wetted hydrocarbon solvent; the mole ratio of hydrocarbylaluminum compound to water is most preferably of the order of about 1:1. This ratio can be varied from about 0.66:1 or lower to about 2.0:1 or higher; and is preferably from about 0.75:1 to about 1.1:1 and most preferably from about 0.95:1 to about 1.05:1. It was found that as this ratio was decreased below about 1:1 the conversion rate of monomer to solid polymer decreased at a fairly rapid rate and that the fluidity and total solids content of the polymerization reaction mixture also decreased; while the same effects were observed as the ratio was increased they were not of the same degree. Consequently, it is advantageous to operate within the preferred ratio range; particularly since it was found that when so operating there is no detectable trace of unreacted hydrocarbylaluminum compound in the mixture of poly(hydrocarbylaluminum oxide) and solvent. The concentration of hydrocarbylaluminum compound in the anhydrous hydrocarbon solvent can vary from about 0.1 to about 10 percent or more by weight; preferably it is from about 1.5 to about 4 percent by weight. The amount of water in the water-wetted hydrocarbon solvent can be varied up to that amount at which the hydrocarbon solvent selected is saturated with water. An amount of water in the hydrocarbon solvent above that at which the solvent is saturated at the particular temperature and pressure selected is preferably avoided since the presence of discrete droplets of water in the solvent is not particularly desirable. However, the amounts of each of the two hydrocarbon streams, the anhydrous hydrocarbon stream containing dissolved hydrocarbylaluminum compound and the water-wetted hydrocarbon stream, are controlled so that the ratio of hydrocarbylaluminum compound to water set forth above is met. In this application whenever the term "hydrocarbyl" is used it represents a saturated alkyl radical or an aryl radical as defined above.

The inert hydrocarbon solvents that can be used in the production of the poly(hydrocarbylaluminum oxides) and in the polymerization are well known and include the saturated aliphatic compounds such as butane, pentane, hexane, heptane, octane, isooctane, the purified kerosenes, etc.; the cycloaliphatics such as cyclobutane, cyclopentane, cyclohexane, cycloheptane, methylcyclopentane, dimethylcyclopentane, etc.; the aromatic solvents such as benzene, toluene, xylene, etc.; and the like. The major requirements in the selection of a solvent are that it be liquid at the reaction temperature, that it does not react with water even though it will dissolve a trace amount of water, that it does not react with the hydrocarbylaluminum compound or poly(hydrocarbylaluminum oxide) or interfere with the desired reactions in any manner.

The poly(hydrocarbylaluminum oxides) can be produced at temperatures from about 5° C. up to the boiling point of the hydrocarbon solvent at the pressure used; preferably at temperatures of from about 20° C. to about 50° C. The pressure during this process can vary from atmospheric pressure up to about 500 p.s.i. or more; preferably from about 50 p.s.i. to about 200 p.s.i.

The hydrocarbylaluminum compounds used as startmaterials in the production of the poly(hydrocarbylaluminum oxides) have the general formula:

wherein R is as defined above and R' represents an alkyl radical or an aryl radical as defined above, or a hydrogen atom. The suitable hydrocarbylaluminum compounds are those which have at least one aluminum to carbon bond such as the trialkylaluminum compounds, the triarylaluminum compounds, the dialkylaluminum hydrides, the diarylaluminum hydrides, the alkylarylaluminum hydrides, the monoalkylaluminum dihydrides, the monoarylaluminum dihydrides, and the like. Illustrative thereof one can mention trimethylaluminum, triethylaluminum, tripropylaluminum, triisopropylaluminum, tri-n-butylaluminum, triisobutylaluminum, trihexylaluminum, trioctylaluminum, tridecylaluminum, tridodecylaluminum, tribenzylaluminum, triphenylaluminum, tritolylaluminum, trinaphthylaluminum, dimethylaluminum hydride, diisobutylaluminum hydride, dihexylaluminum hydride, didecylaluminum hydride, diphenylaluminum hydride, dixylylaluminum hydride, dinaphthylaluminum hydride, methylphenylaluminum monohydride, ethylnaphthylaluminum monohydride, methylaluminum dihydride, ethylaluminum dihydride, isobutylaluminum dihydride, octylaluminum dihydride, dodecylaluminum dihydride, phenylaluminum dihydride, tolylaluminum dihydride, naphthylaluminum dihydride, and the like.

The method of producing the poly(hydrocarbylaluminum oxides) from the hydrocarbylaluminum compounds was previously shown to involve the bringing together of two hydrocarbon solvent streams, one stream being a hydrocarbon solvent solution of the hydrocarbylaluminum compound and the other stream being a water containing hydrocarbon solvent stream. As the two streams contact and initimately mix the reaction between the hydrocarbyl aluminum compound and the water commences; to ensure completion of this reaction, the mixture is then aged. This aging is most advantageously accomplished by passing the mixture through a tubular reactor; however, any other suitable means can be used such as a packed vessel or an agitator equipped vessel. The aging period can vary from a few minutes, or less, to several hours, or more, and is most readily and easily controlled by adjusting the length of the tubular reactor and the flow rate therethrough when the aging reactor is of a tubular nature. The means by which the aging time can be controlled are readily apparent to a skilled engineer. After the produced poly(hydrocarbylaluminum oxide) leaves the aging reactor it is conveyed to the polymerization reactor. It has been found that the use of freshly prepared poly(hydrocarbylaluminum oxide) offers many advantages over the use of material which has been prepared and stored for any lengthy period of time; such advantages include the ability to obtain a polymer slurry which is still quite fluid at solids contents up to about 30 percent by weight and an increase in the polymerization reaction rate. Fresh poly(hydrocarbylaluminum oxide) is material which is used within about 10 to 90 minutes after the two solvent streams have been brought into contact with each other; this period necessarily includes the aging time. While fresh poly(hydrocarbylaluminum oxide) is preferred, polymerization is also achieved using material which has been aged for many months but without the advantages observed by the use of the fresh material. Aging can be at any temperature from about 5° C. up to the boiling point of the hydrocarbon solvent and is preferably at from about 20° C. to about 50° C. Temperature has been found to have a definite effect on aging and the temperature at which aging is effected has an affect on the properties of the polymers produced; higher aging temperatures produce polymers having higher melt indices. The wetting of the hydrocarbon solvent with water can be readily accomplished by passing the solvent through a water-containing packed vessel or other suitable means and such procedures are known to the average skilled scientist or engineer.

Among the transition metal compounds of the metals of Groups IV-A, V-A, and VI-A which can be used as the second component of the catalyst compositions useful in this invention are the compounds of the metals titanium, zirconium, hafnium, cerium, vanadium, niobium, tantalum, chromium, molybdenum, tungsten, thorium, and uranium. The suitable compounds can be represented by the formula $MX_n$ in which M represents the transition metal atom, X represents a halogen atom or an organic group such as an alkoxy or ester radical containing up to about 20 carbon atoms or more and $n$ is the valence state of the transition metal. Illustrative of some of the transition metal compounds which can be used one can mention for example, vanadium dichloride, vanadium trichloride, vanadium tetrachloride, vanadium trifluoride, vanadium tetrafluoride, vanadium pentafluoride, vanadium triiodide, titanium dibromide, titanium tribromide, titanium tetrabromide, titanium dichloride, titanium trichloride, titanium tetrachloride, titanium trifluoride, titanium tetrafluoride, titanium diiodide, titanium tetraiodide, zirconium dibromide, zirconium tribromide, zirconium tetrabromide, zirconium dichloride, zirconium trichloride, zirconium tetrachloride, zirconium tetrafluoride, zirconium tetraiodide, niobium pentabromide, niobium pentachloride, niobium pentafluoride, tantalum pentabromide, tantalum pentachloride, tantalum pentafluoride, chromous bromide, chromic bromide, chromous chloride, chromic chloride, chromous fluoride, chromic fluoride, molybdenum dibromide, molybdenum tribromide, molybdenum tetrabromide, molybdenum dichloride, molybdenum trichloride, molybdenum tetrachloride, molybdenum pentachloride, molybdenum hexafluoride, and the like. Among the organic compounds of the transition metals one can mention chromium acetate, chromium (III)oxy-2-ethylhexanoate, chromium(III)2-ethylhexanoate, chromium(III)dichloroethylhexanoate, chromium (II)2 - ethylhexanoate, titanium(IV)2 - ethylhexanoate, chromium(III)isobutoxide, zirconyl acetate, uranyl butyrate, chromium acetylacetonate, and the like. As previously indicated the transition metal compound can be added to the poly(hydrocarbylaluminum oxide) solution at any time after it has been produced, and it can be added in any convenient form, for example as a solution or slurry in the anhydrous hydrocarbon solvent; with the preferred transition metal compounds being the halogen-free compounds.

The composition of the catalyst complex is such that it contains from about 0.0002 to about 0.05 millimole of transition metal from the $MX_n$ compound and from about 0.2 to about 20 millimoles of aluminum from the poly(hydrocarbylaluminum oxide) compound per liter of inert hydrocarbon solvent present in the polymerization reactor. The mole ratio of transition metal to aluminum in the catalyst complex can be varied from about 1:30 to about 1:3000 or more, but it is preferably from about 1:100 to about 1:800.

Though scavengers are not necessary since all of the reaction components used will be of high purity, one can if desired make use of them. Suitable for use for this purpose are the well known compounds of the formula $MeR'_x$, wherein R' has the same meanings defined above, Me is a metal from the Groups I-A, II-A or III-B of the Periodic Chart, and $x$ is an integer corresponding to the valence of said metal. These compounds are well known and innumerable examples will be found in "Linear and Stereoregular Addition Polymers," by N. G. Gaylord and H. F. Mark, published in 1959 by Interscience Publishers, Inc., New York, as well as in numberless technical papers and domestic and foreign patents in the field of olefin polymerization. When present the scavenger is used at concentrations of from about 0.01 to about 2 millimoles of the scavenger per liter of hydrocarbon solvent.

The catalyst complex and hydrocarbon solvent are contacted with the monomers and modifiers in a polymerization reactor that is equipped with condenser means and recycling means. The polymerization can be carried out at temperatures of from about 0° C. up to the boiling point of the polymerization reaction mixture; preferred conditions are those at which sufficient solvent is present in the vapor phase so as to provide adequate cooling on condensation thereof and at which sufficient ethylene is dissolved in the liquid phase to ensure adequate reaction rates. The polymerization temperature is controlled by removing heat of reaction by volatilization of a portion of the solvent, cooling in the condenser, and returning cooled gaseous vapors and a small amount of condensate thereof to the polymerization reactor. In this manner the polymerization reaction is advantageously controlled, there is no problem of ivory formation on the cooling means, and very little indication of ivory formation on the reactor walls is evident. It was observed that under a given set of reaction conditions the melt index of the polymer produced increased as the temperature was increased.

The pressure in the polymerization reactor can vary from atmospheric pressure to a pressure of about 100 atmospheres or higher. The preferred pressure is from about 3 to about 20 atmospheres and is adjusted to permit sufficient reflux so as to maintain the temperature of the polymerization reaction within the range desired.

The properties of the ethylene polymers produced can be varied by the addition of modifiers to the reaction. Among the modifiers that can be used are hydrogen, which can be added at concentrations up to about 50 mole percent and preferably from about 0.05 to 10 mole percent, based on the polymerizable monomer present; and the mono-unsaturated aliphatic alpha-olefins having from 3 to about 10 carbon atoms, which can be present at total concentrations up to about 40 weight percent and preferably from about 0.05 to about 25 weight percent, based on the ethylene feed. Illustrative of the suitable olefinic modifiers are propylene, butene-1, pentene-1, 3-methylbutene-1, hexene-1 (also produced in situ), 4-methylpentene-1, 3-ethylbutene-1, heptene-1, octene-1, decene-1, 4,4-dimethylpentene-1, 4,4-diethylhexene-1, 3,4-dimethylhexene-1, styrene, and the like.

As indicated earlier, in some instances during the polymerization of the ethylene some dimerization or trimerization occurs and consequently the ethylene polymer obtained is in actuality a copolymer. The amount of ethylene dimerized or trimerized varies depending on many factors such as catalyst complex composition, pressure, temperature, etc. However, when a chromium compound is employed the greatest single factor in the trimerization is the vapor temperature in the polymerization reactor and it was observed that smaller amounts of hexene-1 are produced as the vapor temperature was increased, as indicated below:

| Vapor temp., °C.: | Percent $C_2H_4$ converted to $C_6H_{12}$ |
|---|---|
| 52 | 24 |
| 65 | 14 |
| 77 | 6 |
| 81 | 3 |

The use of titanium compounds in the catalyst complex favors the formation of butene-1.

Since the dimer or trimer formed acts as a modifier affecting the properties of the ethylene polymer produced, the concentration thereof can be controlled either by controlling the polymerization temperature or by removing it from the reaction zone; removal is readily accomplished at the time that the vapors are condensed in the condenser. The concentration of dimer or trimer has a noticeable effect on the density of the ethylene polymer. It was observed that as the hexene-1 concentration in the polymerization reactor increased from 0.53 to 3.0 mole percent that the density of the polyethylene decreased from 0.965 g./cc. to 0.946 g./cc. Similar effects are observed with the other olefinic modifiers. The major effects observed by the addition of hydrogen to the polymerization reactor were a narrowing of the molecular weight distribution, which resulted in improved "hot short" properties, and lowering of the flow rate ratios of the polymers.

In the appended examples the following test procedures were employed:

Melt index—A.S.T.M. D1238–57T, at 190° C. and 44 p.s.i.g.

Flow rate—A.S.T.M. D1238–57T, at 190° C. and 440 p.s.i.g.

Flow Rate Ratio—

$$\frac{\text{Flow rate}}{\text{Melt index}}$$

Density—A.S.T.M. 1505–57.
Stiffness modulus—A.S.T.M. D638–56T.
Tensile strength—A.S.T.M. D638–56T.
Yield strength—A.S.T.M. D638–56T.
Elongation—A.S.T.M. D638–56T.
Stress crack resistance—The procedure used was that set forth by De Coste et al., Ind. and Eng. Chem., vol. 43, No. 1, pp. 117 et seq. The samples were 125 mil specimens aged for 30 minutes in boiling water and then tested at 50° C. in octylphenoxypoly(ethyleneoxy)ethanol.

Example 1

Normal pentane was purified by distillation and drying for use in producing the poly(isobutylaluminum oxide) component and in the polymerization reaction.

A first stream of dry n-pentane from storage vessel 4 was saturated with water at 43° C. in solvent saturator 6. The n-pentane flow through saturator 6 was at a rate of 43.4 pounds per hour and the amount of water dissolved in the n-pentane was 309 millimoles per hour.

This water-saturated first stream was admixed in conduit 11 with a second stream consisting of a 3 percent solution of triisobutylaluminum in dry heptane; the flow rate of the second stream was adjusted so that 309 millimoles per hour of triisobutylaluminum were combined with the 309 millimoles of water per hour introduced into the first stream. The mixture was aged in reactor 8 at ambient temperature for 10 minutes. The poly(isobutylaluminum oxide) solution was conveyed to the polymerization reactor 16 to which additional dry n-heptane at the rate of about 100 pounds per hour and a solution of chromic 2-ethylhexanoate at the rate of 1,030 micromoles per hour of the chromium compound were added. The polymerization was carried out at about 75° C. to 82° C. at a pressure of 160 p.s.i.g. maintained by demand feeding of ethylene. Ethylene and the trimer thereof (hexene-1) produced during the reaction copolymerized at a rapid rate. The average residence time in the reactor was about 1.3 hours. A slurry of the ethylene polymer in n-heptane at a solids content of from about 10 to 20 percent by weight was continuously removed from the reactor via exit means 33. The polyethylene was recovered and dried by conventional means and the n-heptane was purified and recycled. The temperature in reactor 16 was controlled by control of the cooling water rate to condenser 16; the rate controlled the temperature of the solvent vapors recycled to the reactor via pump 20. Water at 12° C. was circulated through the condenser at a rate of four gallons per minute. The results obtained on a series of samples removed at various times during the continuous operation of the process are set forth in Table I.

TABLE I

| Sample | A | B | C | D | E |
|---|---|---|---|---|---|
| Polymerization period, hrs | 2 | 3 | 5 | 3 | 3 |
| Total solids content, percent | | 10.0 | | 15.6 | 20.2 |
| Yield, lbs | 44 | 46 | 119 | 72 | 76 |
| Melt Index, dgm./min | 0.84 | 0.14 | 0.80 | 2.04 | 1.82 |
| Flow rate ratio | 106 | 210 | 131 | 119 | 122 |
| Density | 0.9617 | 0.9579 | 0.9568 | 0.9608 | 0.9597 |
| Stiffness, p.s.i. $\times 10^{-3}$ | 139 | 136 | 140 | 163 | 153 |
| Tensile strength, p.s.i. | 3,800 | 3,900 | 3,600 | 3,900 | 3,920 |
| Yield strength, p.s.i. | 3,800 | 3,900 | 3,600 | 3,900 | 3,920 |
| Elongation, percent | 75 | 290 | 75 | 75 | 72 |
| Stress crack resistance: | | | | | |
| $F_0$, hrs | | | 70 | | |
| $F_{50}$, hrs | | | 90 | | |

In a similar manner ethylene polymer is produced by substitution of poly(methylaluminum oxide), poly(decylaluminum oxide), poly(phenylaluminum oxide), or poly(naphthylaluminum oxide) for the poly(isobutylaluminum oxide) as the first component of the catalyst complex; and by substitution of titanium trichloride, titanium tetrachloride, vanadium tribromide, zirconium tetrachloride, chromic chloride, molybdenum trichloride, chromium acetate, titanium (III) 2-ethylhexanoate, or zirconyl butyrate for the chromium 2-ethylhexanoate as the second component of the catalyst complex. The ethylene polymer is produced by any of the combinations of a first component with a second component set forth above; i.e., titanium trichloride is used in combination with poly(methylaluminum oxide) or any of the first components set forth and the other second components referred to are similarly used.

Example 2

Ethylene polymer was produced as described in Example 1 with the exception that hydrogen at various concentrations was also fed into the polymerization reactor during polymerization. In some instances the ratio of aluminum to water was also varied to observe the effect that this variation would have on the polymer properties. The reaction conditions and results are set forth in Table II.

TABLE II

| Sample | A | B | C | D | E | F | G | H | I | J |
|---|---|---|---|---|---|---|---|---|---|---|
| Polymerization period, hrs | 2 | 2 | 2 | 3 | 6 | 4 | 8 | 5 | 14 | 3 |
| Al:$H_2O$ ratio | 1.00 | 1.02 | 1.03 | 1.04 | 1.26 | 1.16 | 1.03 | 1.10 | 1.02 | 1.05 |
| Al, millimoles/l | 3.07 | 3.03 | 3.06 | 3.08 | 4.18 | 3.5 | 3.08 | 3.22 | 3.13 | 3.11 |
| Cr, micromoles/l | 5.05 | 5.05 | 2.54 | 6.17 | 5.24 | 5.62 | 6.72 | 5.70 | 6.56 | 4.65 |
| Solvent temp., °C | 77.5 | 80 | 75 | 78 | 69 | 79 | 71 | 73.5 | 70.5 | 68 |
| Hydrogen, percent | 1.7 | 4.7 | 0.7 | 2.6 | 0.74 | 0.18 | 3.0 | 4.6 | 2.0 | 3.0 |
| Total solids, content, percent | 16.5 | 17.1 | 14.1 | 9.4 | 7.8 | 8.2 | 15.2 | 14.9 | 15.3 | 16.4 |
| Yield, lb | 76 | 66 | 52 | 50 | 54 | 45 | 107 | 80 | 170 | 67 |
| Melt index, dgm./min | 1.37 | 0.92 | 2.09 | 5.64 | 0.60 | 0.26 | 1.05 | 0.66 | 0.44 | 0.49 |
| Flow rate ratio | 114 | 123 | 110 | 113 | 136 | 198 | 97 | 103 | 114 | 91 |
| Density, g./cc | 0.9580 | 0.9516 | 0.9593 | 0.9634 | 0.9608 | 0.9584 | 0.9544 | 0.9580 | 0.9570 | 0.9570 |
| Stiffness, psi. ×$10^{-3}$ | 158 | 148 | 146 | 168 | 162 | 147 | 134 | 140 | 143 | 143 |
| Tensile strength, p.s.i | 3,910 | 3,700 | 3,850 | 3,700 | 3,900 | 3,685 | 3,450 | 3,650 | 3,650 | 3,730 |
| Yield strength, p.s.i | 3,910 | 3,700 | 3,850 | 3,700 | 3,900 | 3,685 | 3,450 | 3,650 | 3,650 | 3,730 |
| Elongation, percent | 32 | 260 | 139 | 140 | 91 | 630 | 145 | 420 | 120 | 400 |
| Stress crack resistance: | | | | | | | | | | |
| $F_0$, hrs | 17 | 25 | | | 30 | | 51 | 43 | 102 | 58 |
| $F_{50}$, hrs | 21 | 30 | | | 45 | | 63 | 60 | 122 | 74 |

*Example 3*

Ethylene polymer was produced as described in Example 2; the reaction conditions and results are set forth in Table III.

TABLE III

| Sample | A | B | C | D | E | F | G |
|---|---|---|---|---|---|---|---|
| Polymerization period, hrs | 12 | 2 | 12 | 8 | 4 | 2 | 5 |
| Al:$H_2O$ ratio | 1.33 | 1.41 | 1.44 | 1.65 | 1.70 | 1.72 | 1.73 |
| Al, millimoles/l | 3.68 | 4.26 | 4.64 | 4.59 | 4.52 | 4.6 | 4.85 |
| Cr, micromoles/l | 7.5 | 7.4 | 7.05 | 8.35 | 10.6 | 7.6 | 7.6 |
| Solvent, temp., °C | 77.2 | 89 | 79.7 | 78.8 | 80 | 79.5 | 78.8 |
| Hydrogen, percent | | 3 | 5.2 | 7.6 | 6.35 | 6.6 | 9.9 |
| Total solids content, percent | 12 | 16.5 | 11.5 | 13.9 | 8.7 | 18.0 | 13.0 |
| Yield, lb | 56 | 69 | 84 | 166 | | | |
| Melt index, dgm./min | 67 | 2.25 | 20.5 | 8.4 | 6.88 | 2.22 | |
| Flow rate ratio | 89 | 73 | 80 | 47 | 75 | 74 | |
| Density, g./cc | 0.9593 | 0.9555 | 0.9644 | 0.9551 | 0.9606 | 0.9506 | |
| Stiffness, p.s.i. ×$10^{-3}$ | 144 | 133 | 173 | 157 | 155 | 143 | |
| Tensile strength, p.s.i | 3,720 | 3,960 | 3,700 | 3,880 | 4,000 | 3,700 | |
| Yield strength, p.s.i | 3,720 | 3,960 | 3,700 | 3,880 | 4,000 | 3,700 | |
| Elongation, percent | 205 | 65 | 5 | 110 | 37 | 120 | |

*Example 4*

Ethylene polymer was produced in a manner similar to that described in Example 1; the solvent used in this instance was dry n-heptane. An n-heptane solution of triisobutylaluminum was contacted at the indicated rate of millimoles of aluminum compound per hour with water saturated n-heptane at the indicated rate of millimoles of water per hour to continuously produce the poly(isobutylaluminum oxide). Chromic 2-ethylhexanoate and dry n-heptane were added at the rates shown. The reaction conditions and properties are set forth in Table IV.

TABLE V

| Sample | A | B | C |
|---|---|---|---|
| Triisobutylaluminum, millimole/hr | 4.6 | 4.6 | 5.7 |
| Water, millimoles/hr | 3.6 | 3.7 | 5.7 |
| n-Heptane, l./hr | 1.52 | 1.55 | 1.72 |
| Cr, micromoles/hr | 11.7 | 12.0 | 20.0 |
| Temp., °C | 73 | 73 | 75 |
| Pressure, p.s.i.g | 100 | 100 | 175 |
| Total solids content, percent | 16.0 | 19.9 | 26.8 |
| Yield, g./hr./g. catalyst complex | 246 | 286 | 354 |
| Melt index, dgm./min | 1.57 | 1.59 | 2.04 |
| Flow rate ratio | 99 | 106 | 97 |
| Density, g./cc | 0.9573 | 0.9549 | 0.9462 |
| Cyclohexane extractables, weight percent | 0.24 | 0.65 | 0.58 |

*Example 5*

In this example the poly(isobutylaluminum oxide) was produced discontinuously by a batch process and aged for a longer period of time. The presence of additional triisobutylaluminum in the polymerization reaction has been found from experience to have only a minor effect on the polymerization rate. In Sample A the poly(isobutylaluminum oxide) was aged about 3 months and in Sample B one day; the chromium compound used in Sample B was chromium acetylacetonate. The results are set forth in Table V.

TABLE V

| Sample | A | B |
|---|---|---|
| Additional TIBA, millimoles/hr | 1.7 | 2.0 |
| n-Heptane, l./hr | 1.6 | 1.7 |
| Cr, micromoles/hr | 11.4 | 5.7 |
| Temp., °C | 74 | 74 |
| Pressure, p.s.i.g | 150 | 100 |
| Total solids content, percent | 11 | 7.1 |
| Yield, g./hr./g. catalyst complex | 100 | 105 |
| Melt index, dgm./min | 0.16 | 0.29 |
| Flow rate ratio | 151 | 135 |
| Density, g./cc | 0.9579 | 0.9579 |
| Cyclohexane extractables, weight percent | 4.1 | 7.5 |

A comparison of the yield rates and extractables in Examples 4 and 5 shows the advantages of operating by the continuous process of the present invention.

*Example 6*

Ethylene polymer was produced in a manner similar to that described in Example 1. The monomers feed charged to the polymerization reactor was a mixture of ethylene and propylene and the solvent was dry heptane. The reaction conditions and polymer properties are set forth in Table VI.

TABLE VI

| Sample | A | B |
|---|---|---|
| Polymerization period, hrs | 4 | 4 |
| Al:$H_2O$ ratio | 1:1 | 1:1 |
| Al, millimoles/l | 2.5 | 2.5 |
| Cr, micromoles/l | 6.5 | 6.5 |
| Propylene, mole percent in feed gas | 23 | 23 |
| Propylene, mole percent in vent gas | 12.1 | 13.0 |
| Solvent temp., °C | 73 | 62 |
| Pressure, p.s.i.g | 100 | 150 |
| Yield, g | 627 | 784 |
| Melt index, dgm./min | 1.1 | 0.34 |
| Flow rate ratio | 121 | 122 |
| Density, g./cc | 0.950 | 0.941 |
| Elongation, percent | 142 | 188 |

In a similar manner ethylene polymers are produced using butene-1, 4-methylpentene-1, octene-1, decene-1, or styrene for the propylene in the monomers feed charge.

What is claimed is:

1. A continuous process for the preparation of a catalyst complex which comprises (1) introducing a first stream of a liquid, dry, inert, hydrocarbon solvent to a first reaction zone containing water wherein said first stream becomes wetted with water, (2) introducing said water-containing first stream and a second stream of a solution of a hydrocarbylaluminum compound in a liquid, dry, inert, hydrocarbon solvent to a second reaction zone wherein the hydrocarbylaluminum compound and water react and produce a hydrocarbon solvent solution of poly(hydrocarbylaluminum oxide), and (3) after aging said solution adding thereto a transition metal compound whereby the preparation of said catalyst complex is complete.

2. A continuous process for the preparation of a catalyst complex which comprises (1) introducing a first stream of a liquid, dry, inert hydrocarbon solvent and water to a first reaction zone wherein said first stream becomes wetted with water, (2) introducing said water-containing first stream and a second stream of a solution of a hydrocarbylaluminum compound of the formula $$R-Al-R'_2$$

wherein R is selected from the group consisting of alkyl radicals and aryl radicals having from 1 to 12 carbon atoms and R' is selected from the group consisting of alkyl radicals and aryl radicals having from 1 to 12 carbon atoms and hydrogen, in a liquid, dry, inert hydrocarbon solvent to a second reaction zone wherein the hydrocarbylaluminum compound and water react and produce a hydrocarbon solvent solution of poly(hydrocarbylaluminum oxide) of the formula:

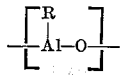

wherein R is as hereinbefore defined, and (3) after aging said solution adding thereto a transition metal compound selected from the group consisting of the metals of Groups IV-A, V-A, and VI-A whereby the preparation of said catalyst complex is complete.

3. The continuous process as claimed in claim 2 wherein the mole ratio of hydrocarbylaluminum compound to water introduced to said second reaction zone is from 0.66:1 to 2:1.

4. The continuous process as claimed in claim 2 wherein the mole ratio of hydrocarbylaluminum compound to water introduced to said second reaction zone is from 0.75:1 to 1.1:1.

5. The continuous process as claimed in claim 2 wherein the mole ratio of hydrocarbylaluminum compound to water introduced to said second reaction zone is about 1:1.

6. The continuous process as claimed in claim 3 wherein the mole ratio of transition metal to aluminum in the catalyst complex is from 1:30 to 1:3000.

7. The continuous process as claimed in claim 3 wherein the mole ratio of transition metal to aluminum in the catalyst complex is from 1:100 to 1:800.

8. The continuous process as claimed in claim 4 wherein the mole ratio of transition metal to aluminum in the catalyst complex is from 1:30 to 1:3000.

9. The continuous process as claimed in claim 4 wherein the mole ratio of transition metal to aluminum in the catalyst complex is from 1:100 to 1:800.

10. The continuous process as claimed in claim 2 wherein the hydrocarbylaluminum compound is triisobutylaluminum, the poly(hydrocarbylaluminum oxide) produced is poly(isobutylaluminum oxide), and the transition metal compound is chromic 2-ethylhexanoate.

11. A continuous process for the production of solid ethylene polymer which comprises continuously preparing a catalyst complex by (1) introducing a first stream of a liquid, dry, inert, hydrocarbon solvent to a first reaction zone containing water wherein said first stream becomes wetted with water, (2) introducing said water-containing first stream and a second stream of a solution of a hydrocarbylaluminum compound in a liquid, dry, inert, hydrocarbon solvent to a second reaction zone wherein the hydrocarbylaluminum compound and water react and produce a hydrocarbon solvent solution of poly(hydrocarbylaluminum oxide), (3) aging said solution and adding thereto a transition metal compound whereby the preparation of said catalyst complex is complete, and (4) contacting said catalyst complex with an ethylene feed charge in a third reaction zone, therein catalytically polymerizing a portion of said ethylene to dimers and trimers thereof and simultaneously catalytically copolymerizing said produced dimers and trimers and said ethylene and producing said solid ethylene polymer.

12. A continuous process for the production of solid ethylene polymer which comprises continuously preparing a catalyst complex by (1) introducing a first stream of a liquid, dry, inert, hydrocarbon solvent and water to a first reaction zone wherein said first stream becomes wetted with water, (2) introducing said water-containing first stream and a second stream of a solution of a hydrocarbylaluminum compound of the formula $R-Al-R'_2$, wherein R is selected from the group consisting of alkyl radicals and aryl radicals having from 1 to 12 carbon atoms and R' is selected from the group consisting of alkyl radicals and aryl radicals having from 1 to 12 carbon atoms and hydrogen, in a liquid, dry, inert hydrocarbon solvent to a second reaction zone wherein the hydrocarbylaluminum compound and water react and produce a hydrocarbon solvent solution of poly(hydrocarbylaluminum oxide) of the formula:

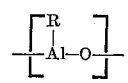

wherein R is as hereinbefore defined, (3) aging said solution and adding thereto a transition metal compound selected from the group consisting of the metals of Groups IV-A, V-A, and VI-A whereby the preparation of said catalyst complex is complete, and (4) contacting said catalyst complex with an ethylene feed charge in a third reaction zone, therein catalytically polymerizing a portion of said ethylene to dimers and trimers thereof and simultaneously catalytically copolymerizing said produced dimers and trimers and said ethylene and producing said solid ethylene polymer.

13. The continuous process as claimed in claim 12 wherein said catalyst complex is contacted in said third reaction zone with a feed charge of ethylene and hydrogen.

14. The continuous process as claimed in claim 12 wherein said catalyst complex is contacted in said third reaction zone with a feed charge of ethylene and a mono-unsaturated aliphatic alpha olefin having from 3 to 10 carbon atoms.

15. The continuous process as claimed in claim 12 wherein said catalyst complex is contacted in said third reaction zone with a feed charge of ethylene, hydrogen, and a mono-unsaturated aliphatic alpha olefin having from 3 to 10 carbon atoms.

16. The continuous process as claimed in claim 12 wherein the mole ratio of hydrocarbylaluminum compound to water introduced to said second reaction zone is from 0.66:1 to 2:1.

17. The continuous process as claimed in claim 12 wherein the mole ratio of hydrocarbylaluminum compound to water introduced to said second reaction zone is from 0.75:1 to 1.1:1.

18. The continuous process as claimed in claim 13 wherein the mole ratio of hydrocarbylaluminum compound to water introduced to said second reaction zone is from 0.75:1 to 1.1:1.

19. The continuous process as claimed in claim 14 wherein the mole ratio of hydrocarbylaluminum compound to water introduced to said second reaction zone is from 0.75:1 to 1.1:1.

20. The continuous process as claimed in claim 15 wherein the mole ratio of hydrocarbylaluminum compound to water introduced to said second reaction zone is from 0.75:1 to 1.1:1.

21. The continuous process as claimed in claim 16 wherein the mole ratio of transition metal to aluminum in the catalyst complex is from 1:30 to 1:3000.

22. The continuous process as claimed in claim 16 wherein the mole ratio of transition metal to aluminum in the catalyst complex is from 1:100 to 1:800.

23. The continuous process as claimed in claim 18 wherein the mole ratio of transition metal to aluminum in the catalyst complex is from 1:30 to 1:3000.

24. The continuous process as claimed in claim 19 wherein the mole ratio of transition metal to aluminum in the catalyst complex is from 1:30 to 1:3000.

25. The continuous process as claimed in claim 20 wherein the mole ratio of transition metal to aluminum in the catalyst complex is from 1:30 to 1:3000.

26. The continuous process as claimed in claim 12 wherein the hydrocarbylaluminum compound is triisobutylaluminum, the poly(hydrocarbylaluminum oxide) produced is poly(isobutylaluminum oxide), and the transition metal compound is chromic 2-ethylhexanoate.

27. The continuous process as claimed in claim 13 wherein the hydrocarbylaluminum compound is triisobutylaluminum, the poly(hydrocarbylaluminum oxide) produced is poly(isobutylaluminum oxide), and the transition metal compound is chromic 2-ethylhexanoate.

28. The continuous process as claimed in claim 14 wherein the hydrocarbylaluminum compound is triisobutylaluminum, the poly(hydrocarbylaluminum oxide) produced is poly(isobutylaluminum oxide), and the transition metal compound is chromic 2-ethylhexanoate.

29. The continuous process as claimed in claim 15 wherein the hydrocarbylaluminum compound is triisobutylaluminum, the poly(hydrocarbylaluminum oxide) produced is poly(isobutylaluminum oxide), and the transition metal compound is chromic 2-ethylhexanoate.

30. The continuous process as claimed in claim 4 wherein the transition metal compound is a chromic salt.

31. The continuous process as claimed in claim 17 wherein the transition metal compound is a chromic salt.

32. The continuous process as claimed in claim 18 wherein the transition metal compound is a chromic salt.

33. The continuous process as claimed in claim 19 wherein the transition metal compound is a chromic salt.

34. The continuous process as claimed in claim 20 wherein the transition metal compound is a chromic salt.

No references cited.

JOSEPH L. SCHOFER, *Primary Examiner.*

M. B. KURTZMAN, *Assistant Examiner.*